| (12) | United States Patent | (10) Patent No.: | US 8,272,753 B2 |
|---|---|---|---|
| | Kitajima et al. | (45) Date of Patent: | Sep. 25, 2012 |

(54) INDICATOR-INTEGRATED REARVIEW MIRROR FOR VEHICLE

(75) Inventors: Takeshi Kitajima, Saitama (JP); Masanori Nakamura, Saitama (JP); Ryohei Kitamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 270 days.

(21) Appl. No.: 11/896,427

(22) Filed: Aug. 31, 2007

(65) Prior Publication Data

US 2008/0062544 A1 Mar. 13, 2008

(30) Foreign Application Priority Data

Sep. 8, 2006 (JP) .................................. 2006-244086
May 23, 2007 (JP) .................................. 2007-136608

(51) Int. Cl.
*G02B 5/08* (2006.01)
*G02B 7/18* (2006.01)
*G02B 7/182* (2006.01)

(52) U.S. Cl. ........................ 359/841; 359/844; 359/871

(58) Field of Classification Search .................. 362/494; 359/842, 841

See application file for complete search history.

(56) References Cited

U.S. PATENT DOCUMENTS

| 5,499,169 A * | 3/1996 | Chen .............................. 362/494 |
| 6,494,602 B2 * | 12/2002 | Pastrick et al. ................ 362/494 |
| 6,695,465 B2 * | 2/2004 | Apfelbeck .................... 362/494 |
| 6,811,288 B2 * | 11/2004 | Hutzel ........................... 362/494 |
| 6,932,497 B1 * | 8/2005 | Huang ........................... 362/494 |
| 2001/0055214 A1 * | 12/2001 | Chang ........................... 362/494 |

FOREIGN PATENT DOCUMENTS

| EP | 1428745 A2 | 6/2004 |
| GB | 1172382 | 12/1969 |
| JP | 4-325386 A | 11/1992 |

* cited by examiner

*Primary Examiner* — Jade R Chwasz (74) *Attorney, Agent, or Firm* — Birch, Stewart, Kolasch & Birch, LLP (57) ABSTRACT

An indicator-integrated rearview mirror for a vehicle in which the number of components are reduced to simplify and lighten the structure thereof. A housing of a rearview mirror is divided into two of a front housing and a rear housing which are made of resin, an indicator system is supported by the front housing, and a mirror part is supported by the rear housing. Both housings are attached to each other by engagement of locking pawls with locking holes. A spherical-shaped engaging part supports the mirror part while the angle thereof can be adjusted. The rear housing is configured by integrally forming an accommodation part for the mirror part and an attachment stay part attached to the vehicle body-side, and the front housing is configured by integrally forming an accommodation part for the indicator system and a cover for covering the attachment stay part.

21 Claims, 13 Drawing Sheets

INDICATOR-INTEGRATED REARVIEW MIRROR FOR VEHICLE

CROSS-REFERENCE TO RELATED APPLICATIONS

The present application claims priority under 35 USC 119 to Japanese Patent Application Nos. 2006-244086 and 2007-136608 filed on Sep. 8, 2006 and May 23, 2007, respectively, the entire contents of which are hereby incorporated by reference.

BACKGROUND OF THE INVENTION

1. Field of the Invention

The present invention relates to an indicator-integrated rearview mirror for a vehicle. More particularly, to an indicator-integrated rearview mirror for a vehicle in which the number of components can be cut down to simplify and lighten the structure thereof.

2. Description of Background Art

Indicator-integrated rearview mirrors are known in which indicator systems on the front side in the vehicle-traveling direction are attached to left and right rearview mirrors.

JP Patent No. 3162418 discloses a rearview mirror system for a motorcycle which is configured in such a manner that a lens part of an indicator system faces outside of a housing from a window part formed in the housing of a rearview mirror.

However, in JP Patent No. 3162418 a stay made of metal is attached to a vehicle body, and a housing made of resin and a stay which supports the rearview mirror while the angle thereof can be adjusted are attached to the metal stay using screws. Thus, there has been still room for further creativity in order to cut down the number of components and to lighten the weight of the whole rearview mirror system.

SUMMARY AND OBJECTS OF THE INVENTION

An object of an embodiment of the present invention is to address the above described problems so as to provide an indicator-integrated rearview mirror for a vehicle in which the number of components can be cut down to simplify and lighten the structure thereof.

In order to achieve the above-described object, according to an embodiment of the present invention an indicator-integrated rearview mirror for a vehicle is provided in which an indicator system is attached to a housing of a rearview mirror including a mirror part. The housing is made of resin, and is divided into a front housing and a rear housing. The indicator system is supported by the front housing with the mirror part being supported by the rear housing.

According to an embodiment of the present invention, the indicator-integrated rearview mirror for a vehicle, wherein a spherical-shaped engaging part which supports the mirror part while the angle thereof can be adjusted, is formed integrally with the rear housing.

According to an embodiment of the present invention, the indicator-integrated rearview mirror for a vehicle provides the front housing and the rear housing that are attached to each other by engagement of locking pawls with locking holes.

According to an embodiment of the present invention, the indicator-integrated rearview mirror for a vehicle includes a plane part facing the front housing that is formed in the rear housing, and the locking holes are formed at edges of the plane part.

According to an embodiment of the present invention, the indicator-integrated rearview mirror for a vehicle includes the rear housing that is configured by integrally forming an accommodation part for the mirror part and an attachment stay part attached to the vehicle body-side.

According to an embodiment of the present invention, the indicator-integrated rearview mirror for a vehicle includes the front housing that is configured by integrally forming an accommodation part for the indicator system and a cover for covering the attachment stay part.

According to an embodiment of the present invention, the housing is made of resin, and is divided into the front housing and the rear housing. The indicator system is supported by the front housing and the mirror part is supported by the rear housing. Accordingly, it is possible to simplify the structure and to cut down the number of components.

According to an embodiment of the present invention, the spherical-shaped engaging part which supports the mirror part while the angle thereof can be adjusted is formed integrally with the rear housing. Accordingly, a stay or the like which is separately provided to support the mirror part is not required. Thus, it is possible to cut down the number of components and to lighten the weight of the indicator-integrated rearview mirror.

According to an embodiment of the present invention, the front housing and the rear housing are attached to each other by engagement of the locking pawls with the locking holes. Accordingly, none of tightening members such as screws are required. Thus, it is possible to cut down the number of components and to lighten the weight of the indicator-integrated rearview mirror. Further, it is possible to attach/detach the front housing to/from the rear housing without using any tools. Furthermore, since it is possible to access the indicator system supported by the front housing without using any tools, the exchange of an indicator bulb can be easily performed.

According to an embodiment of the present invention, the plane part facing the front housing is formed in the rear housing, and the locking holes are formed at edges of the plane part. Accordingly, the rear housing which is enhanced in rigidity by the provision of the plane part is hardly deformed. Thus, it is possible to stably support the front housing and to easily perform the attachment and detachment work in which the locking pawls of the front housing are bent.

According to an embodiment of the present invention, the rear housing is configured by integrally forming the accommodation part for the mirror part and the attachment stay part attached to the vehicle body-side. Accordingly, it is possible to cut down the number of components and to simplify the configuration of the indicator-integrated rearview mirror.

According to an embodiment of the present invention, the front housing is configured by integrally forming the accommodation part for the indicator system and the cover for covering the attachment stay part. Accordingly, it is possible to cut down the number of components and to simplify the configuration of the indicator-integrated rearview mirror.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
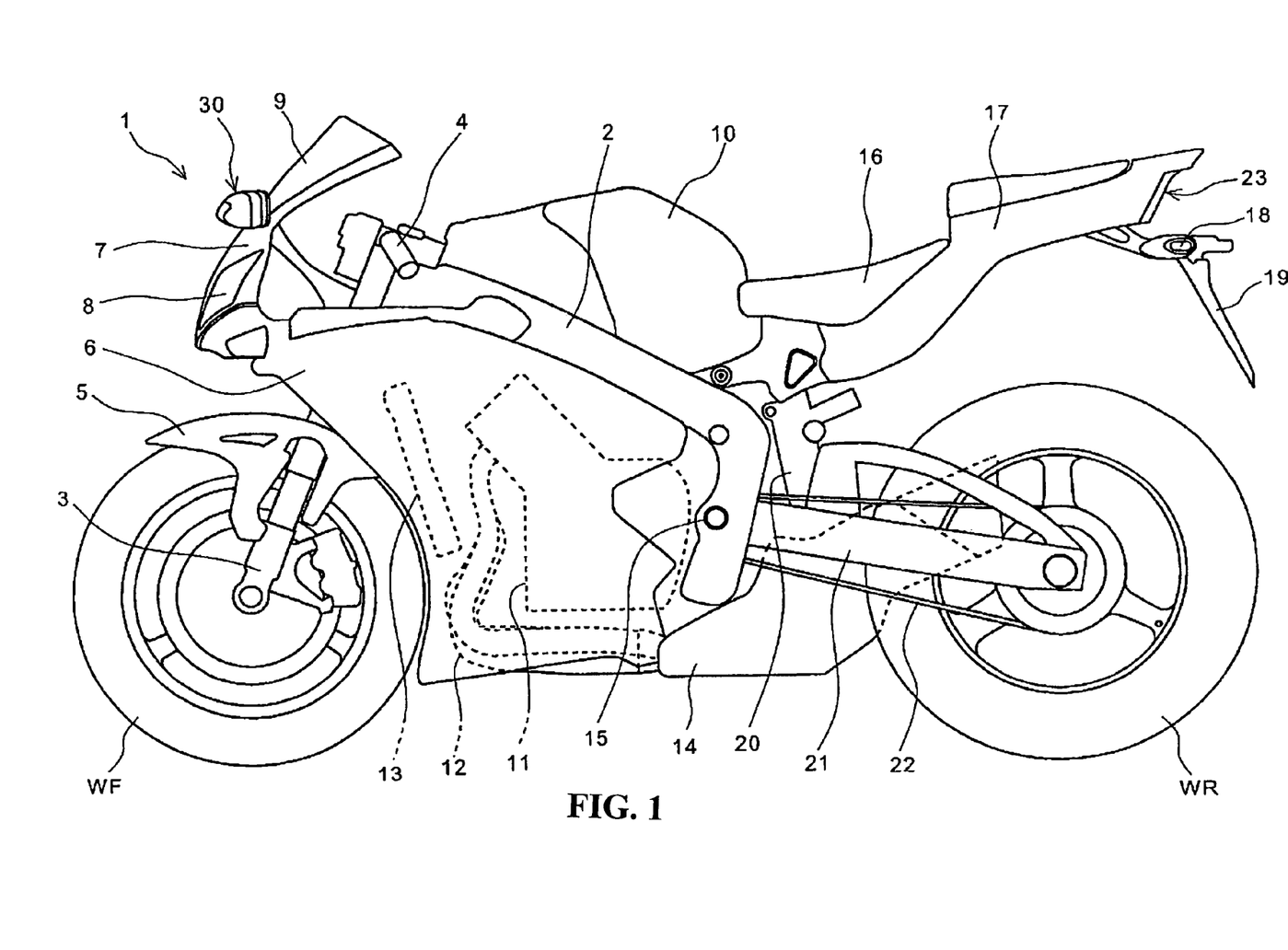
FIG. 1 is a side view of a motorcycle according to an embodiment of the present invention.

Hereinafter, a preferred embodiment of the present invention will be described in detail with reference to the drawings. FIG. 1 is a side view of a motorcycle 1 to which indicator-integrated rearview mirrors according to the embodiment of the present invention are attached. A pair of front forks 3 rotatably support a front wheel WF journalled under a front fender 5. The pair of front forks are attached to a front end of a main frame 2 so as to be steerable with a handlebar 4. In the rear of the main frame 2 extending diagonally downwardly to the rear of a vehicle body of the motorcycle 1, a swing arm 21 is provide to which a rear drive wheel WR is rotatably journalled. The swing arm 21 is suspended by the vehicle body through a rear shock absorber 20 that is swingably journalled about a pivot shaft 15. An engine 11 as a drive source is arranged under the main frame 2, and the rotational drive power is transmitted to the rear wheel WR through a drive chain 22. Combustion gas exhausted from the engine 11 is introduced to a muffler 14 in which an exhaust expansion chamber and a muffler are integrally formed on the lower side of the vehicle body, through exhaust pipes 12 each of which is provided for each cylinder. A fuel tank 10 is attached to an upper portion of the main frame 2. A seat 16 on which a rider is seated and a seat cowl 17 are arranged behind the fuel tank 10. A taillight unit 23, a rear-side indicator system 18, and a rear fender 19 are attached behind the seat cowl 17.

An upper cowl 7 to which a head light 8 and a wind screen 9 are attached is arranged ahead of a pair of left and right side cowls 6 which cover the engine 11 and a radiator 13. Between the head light 8 and the wind screen 9 of the upper cowl 7, left and right indicator-integrated rearview mirrors 30 according to the embodiment of the present invention are attached in pairs.

Figure 2:
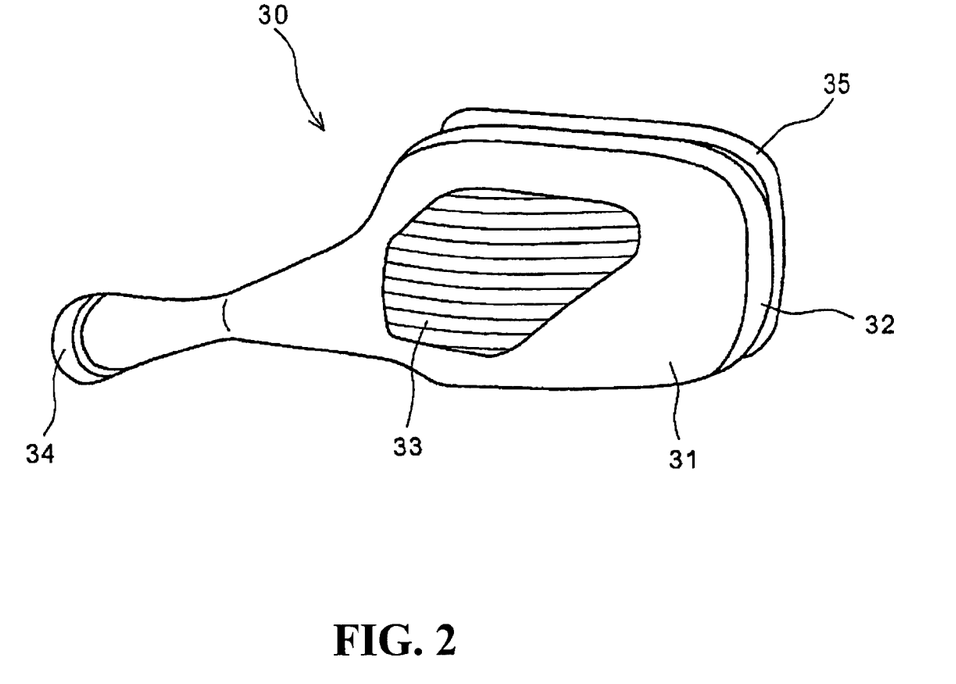
FIG. 2 is a perspective view of an indicator-integrated rearview mirror according to the embodiment of the present invention.

FIG. 2 is a perspective view of one of the indicator-integrated rearview mirrors 30 according to the embodiment. The indicator-integrated rearview mirrors 30 are formed in bilaterally-symmetrical shapes, and therefore the explanation will be given to only the left mirror. The indicator-integrated rearview mirror 30 is configured by a front housing 31, a rear housing 32, an indicator system 33, and a mirror part 35, and is attached to the upper cowl 7 through an attachment plate 34.

Figure 3A:
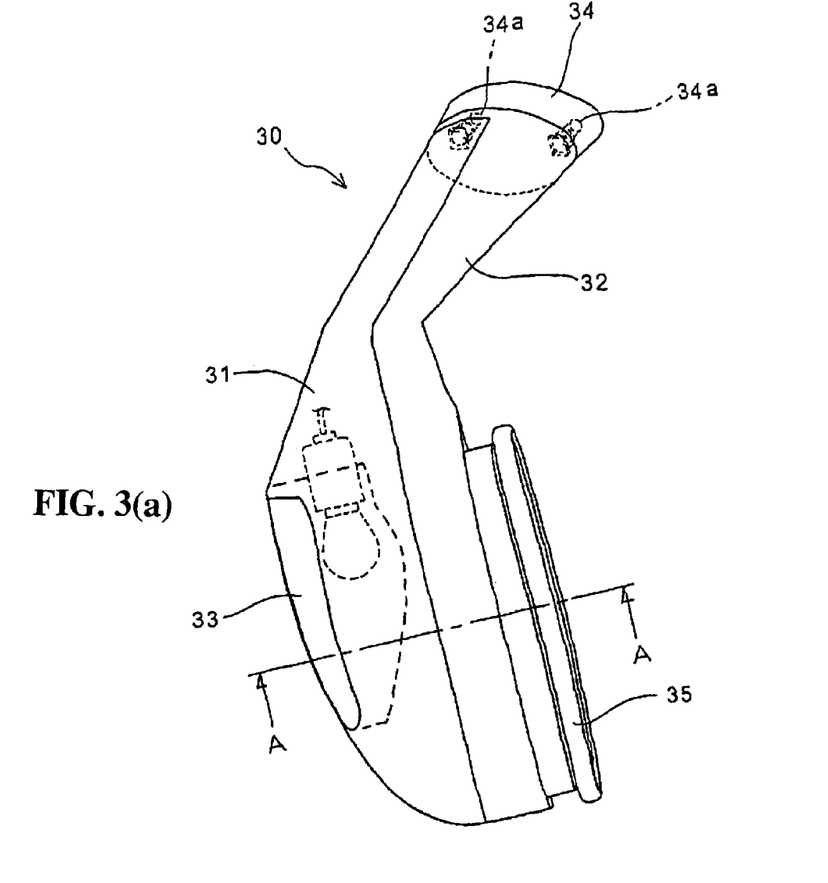
FIG. 3(a) is a top view of the indicator-integrated rearview mirror.
Figure 3B:
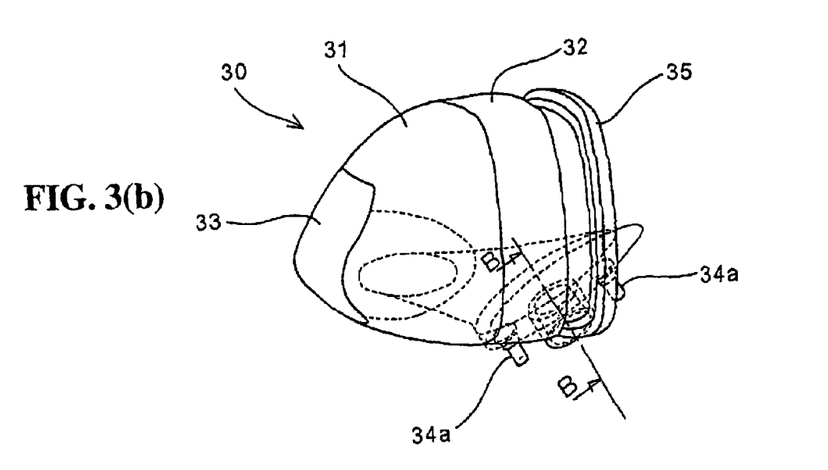
FIG. 3(b) is a side view of the same.

FIGS. 3(a) and 3(b) are a top view and a side view of the indicator-integrated rearview mirror 30, respectively. The front housing 31 and the rear housing 32 are divided in the front-rear direction of the vehicle body and are engaged with each other to form a housing for the rearview mirror. The front housing 31 and rear housing 32 are formed by using thin plates made of resin. The indicator system 33 is supported by the front housing 31 in such a manner that only a light emitting part faces outside from a window part formed in the front housing 31. The mirror part 35 is supported by the rear housing 32 in such a manner that the angle thereof relative to the rear housing 32 can be adjusted. Attachment bolts 34a which are allowed to penetrate the upper cowl 7 to be fitted into tightening nuts (not shown) by screwing are embedded in the attachment plate 34. The attachment plate 34 is not engaged with the front housing 31, but is engaged with only an edge of the rear housing 32.

Figure 4:
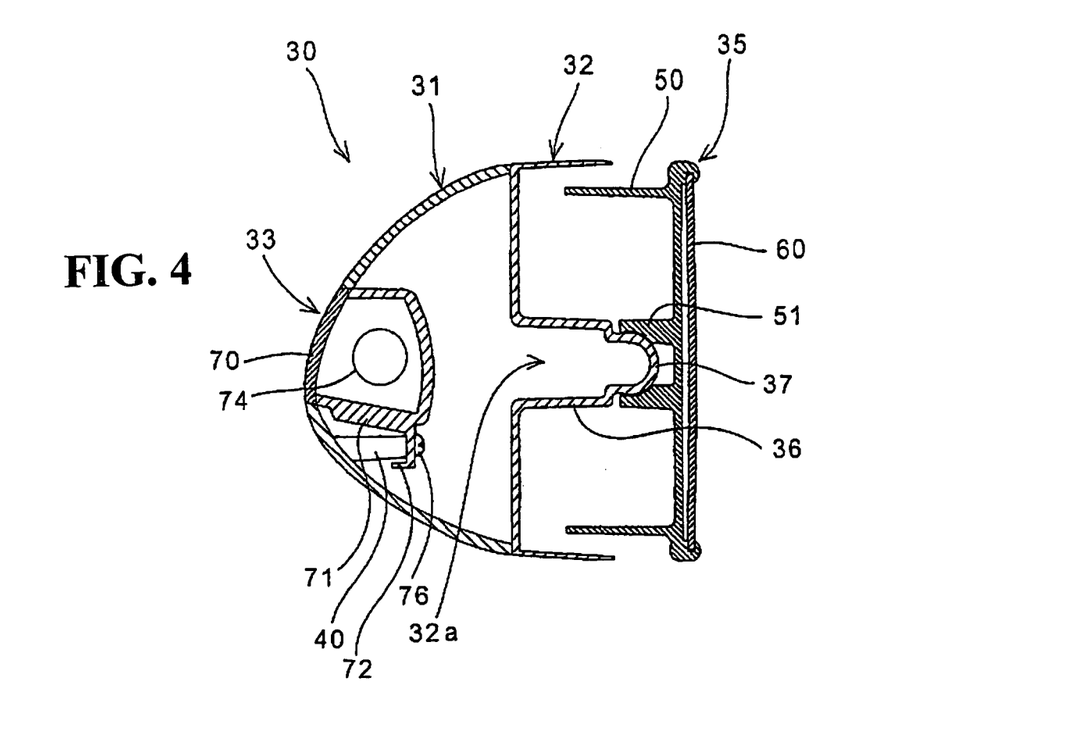
FIG. 4 is a cross-sectional view taken along the line A-A of FIG. 3(a)

FIG. 4 is a cross-sectional view taken along the line A-A of FIG. 3(a). The indicator system 33 is configured in such a manner that a casing 71 for supporting an indicator bulb 74 is covered with an indicator lens 70. An attachment part 72 is formed in the casing 71. The indicator system 33 is fixed to the front housing 31 in such a manner that a tapping screw 76 is allowed to penetrate the attachment part 72 so as to be tightened with an attachment boss 40 formed on a back surface of the front housing 31, so that only the indicator lens 70 faces outside from the window part. A hole part 32a which is configured by integrally forming a cylindrical part 36 and a spherical-shaped engaging projection 37 formed at a tip end of the cylindrical part 36 are formed at a substantially middle portion of the rear housing 32. The mirror part 35 is configured in such a manner that a reflecting mirror 60 is attached to a base 50 made of resin. The engagement of a cylindrical part 51 having an engaging concave part formed at a substantially middle portion of the base 50 with the engaging protrusion 37 allows the mirror part 35 to be supported by the rear housing 32, so that the angle thereof relative to the rear housing 32 can be adjusted.

Figures 5A, 5B:
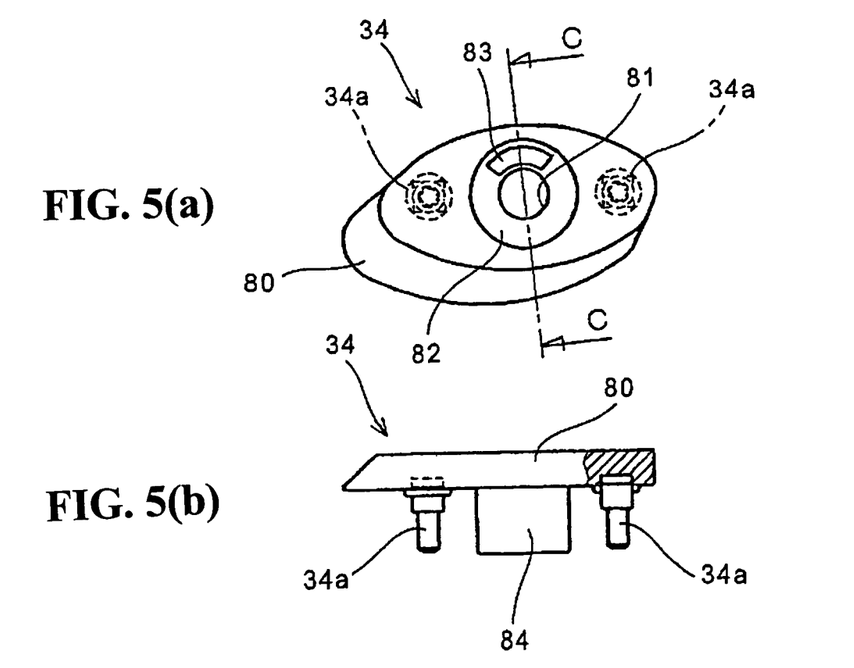
FIGS. 5(a) and 5(b) are a front view and a side view of the attachment plate 34, respectively.
Figure 6:
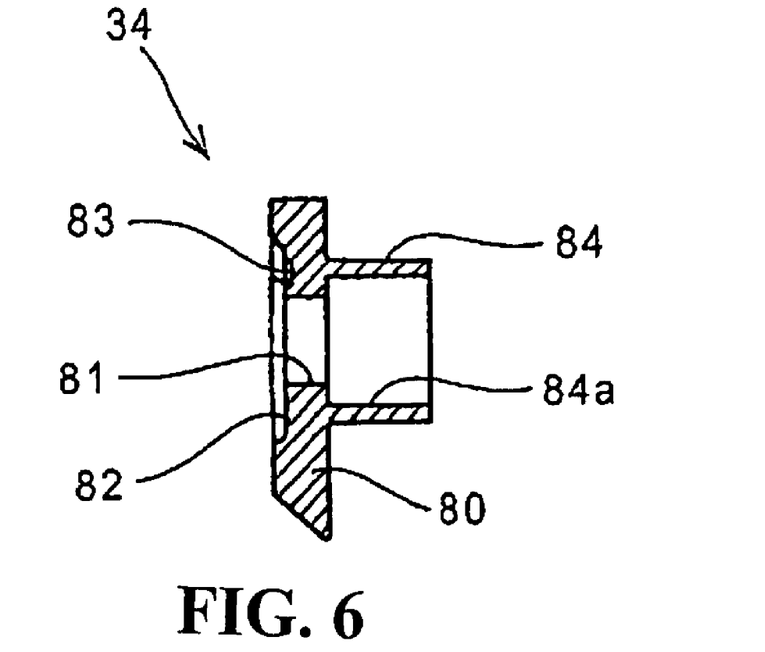
FIG. 6 is a cross-sectional view taken along the line C-C of FIG. 5(a)

FIGS. 5(*a*) and 5(*b*) are a front view and a side view of the attachment plate 34, respectively, and FIG. 6 is a cross-sectional view taken along the line C-C of FIG. 5(*a*). A through-hole 81 is provided at a substantially middle portion of a body part 80 made of resin. A circular-shaped thin-walled part 82 is formed around the through-hole 81, and a groove part 83 having a substantially fan shape is formed at the bottom of the thin-walled part 81. A cylindrical part 84 is formed on a surface opposite to the surface on which the thin-walled part 82 is formed. An inner circumference part 84*a* of the cylindrical part 84 is configured to be in communication with the through-hole 81. The attachment bolts to be fitted into the nuts by screwing are embedded in the body part 80 in the embodiment. However, the bolts may be pins or the like to be engaged with engaging members such as clips.

Figure 7:
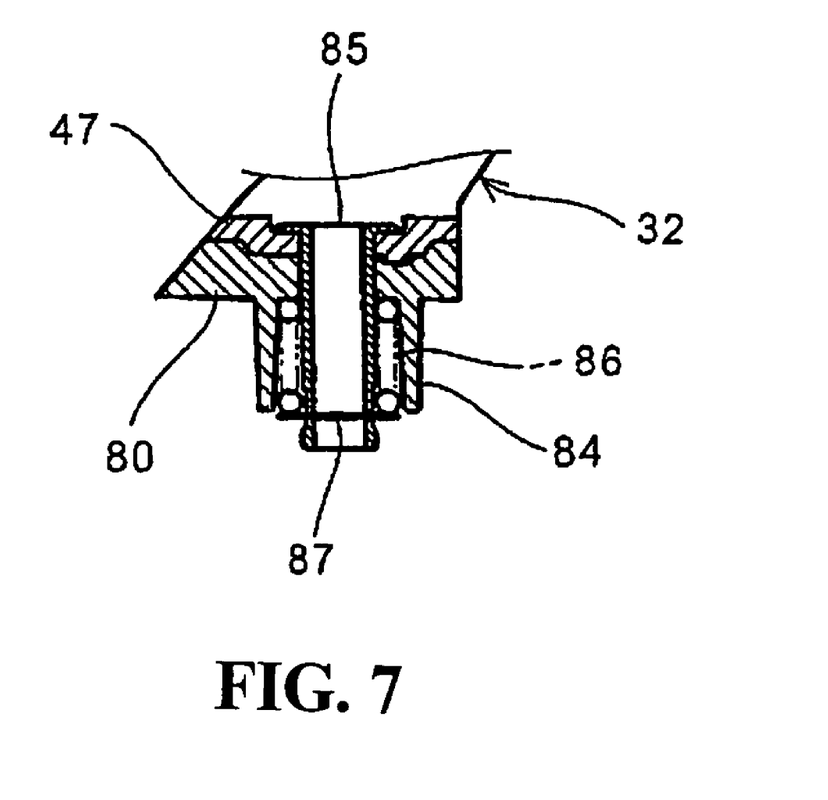
FIG. 7 is a cross-sectional view taken along the line B-B of FIG. 3(b)

FIG. 7 is a cross-sectional view taken along the line B-B of FIG. 3(*b*), and shows a state of being engaged with the rear housing 32. A bottom plate 47 of the rear housing 32 has a convex shape to correspond to the thin-walled part 82 and the groove part 83, and is engaged with the body part 80 in such a manner that a collar head pin 85 is allowed to penetrate both. A clip 87 is attached to one end of the collar head pin 85 while biasing a coil spring 86 inserted into the cylindrical part 84. Thereby, the rear housing 32 is normally held at a predetermined position of the attachment plate 34 fixed to the vehicle body, and can be rotated from the predetermined position by applying a force against the biasing force of the coil spring 86.

Figures 8A, 8B:
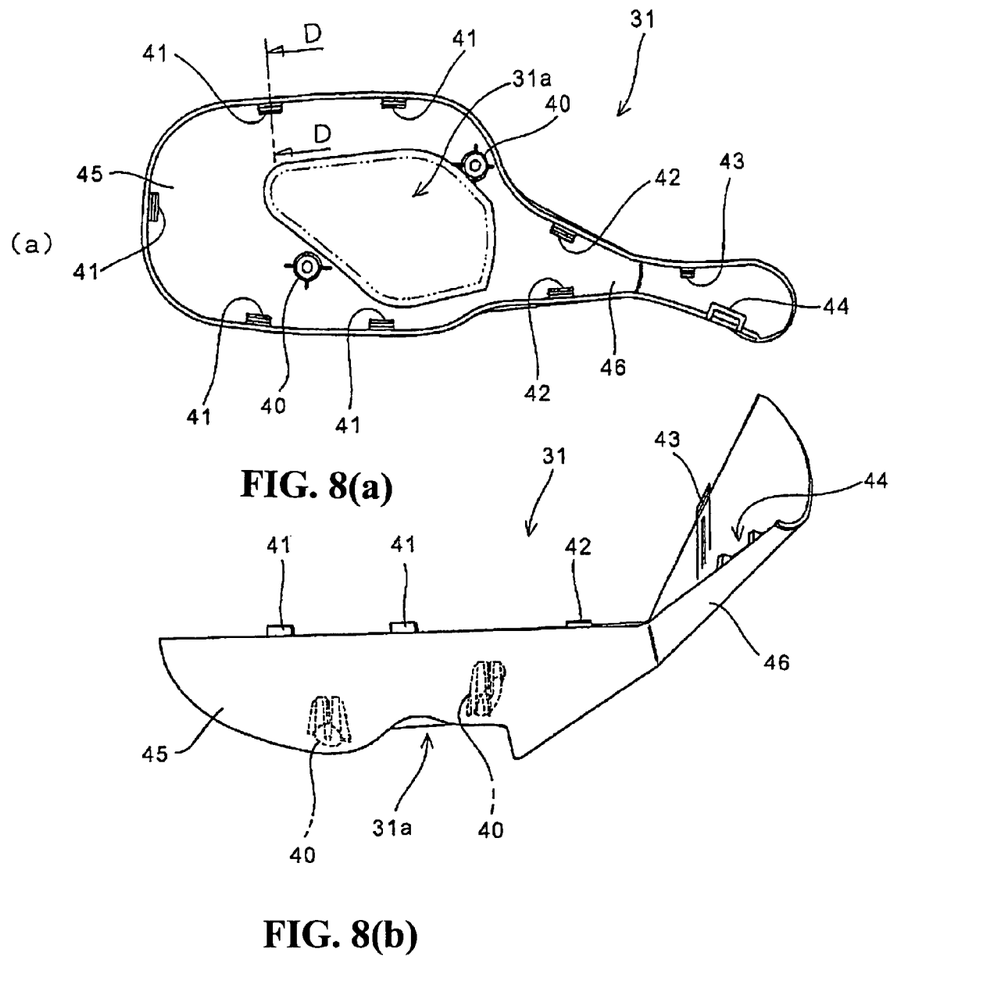
FIG. 8(a) is a rear view of a front housing.
FIG. 8(b) is a bottom view of the same.

FIGS. 8(*a*) and 8(*b*) are a rear view and a bottom view of the front housing 31, respectively. The front housing 31 has a configuration in which an indicator system accommodation part 45 having the indicator system 33 accommodated and a cover part 46 serving as a cover of the rear housing 32 that are integrally formed. On the back surface-side of the front housing 31, that is, on the side where the rear housing 32 is to be engaged, there are formed first locking pawls 41 formed in the indicator system accommodation part 45, second and third locking pawls 42 and 43 formed in the cover part 46, and a fourth locking hole 44.

Figure 9:
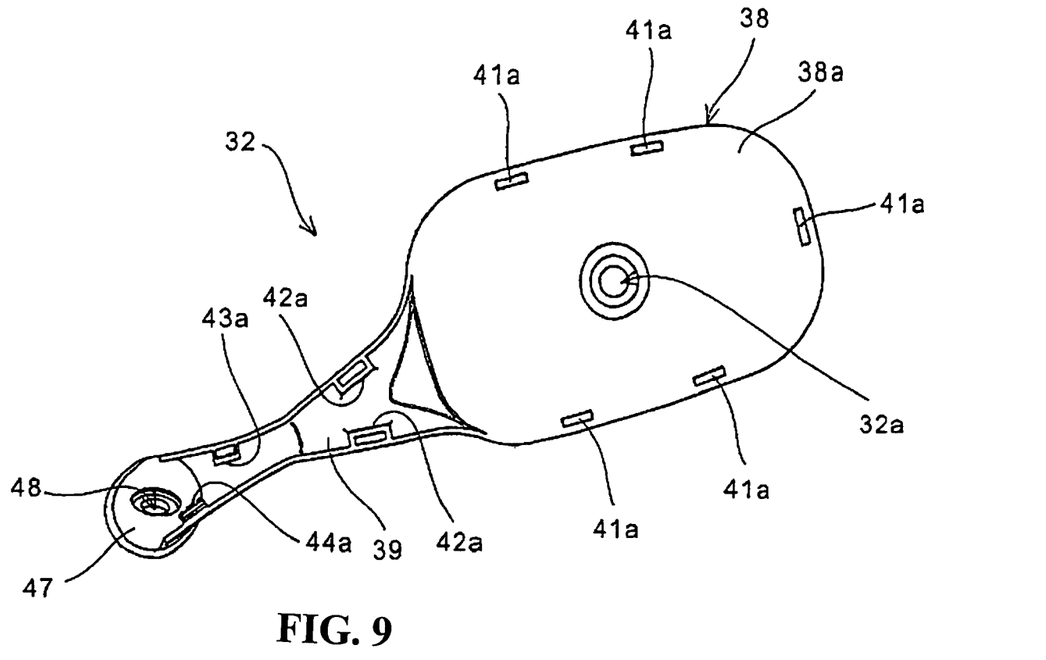
FIG. 9 is a front view of a rear housing.

FIG. 9 is a front view of the rear housing 32. The rear housing 32 has a configuration in which a mirror accommodation part 38 having the mirror part 35 accommodated and an attachment stay part 39 attached to the vehicle body are integrally formed. A plane part 38*a* facing the front housing 31 is formed in the mirror accommodation part 38. First locking holes 41*a*, to be engaged with the first locking pawls 41, are formed at edges of the plane part 38*a*. In the attachment stay part 39, there are formed second locking holes 42*a* to be engaged with the second locking pawls 42, a third locking hole 43*a* to be engaged with the third locking pawl 43, and a fourth locking pawl 44*a* to be engaged with the fourth locking hole 44. The configuration of these locking pawls and locking holes allows the front housing 31 and the rear housing 32 to be stably fixed to each other without using tightening members such as bolts and screws. Accordingly, it is possible to cut down the number of components, and to simplify the assembly work. It should be noted that a through-hole 48 into which the collar head pin 85 is inserted is formed in the bottom plate 47 to be engaged with the attachment plate 34 (see FIG. 7).

Figures 10A, 10B:
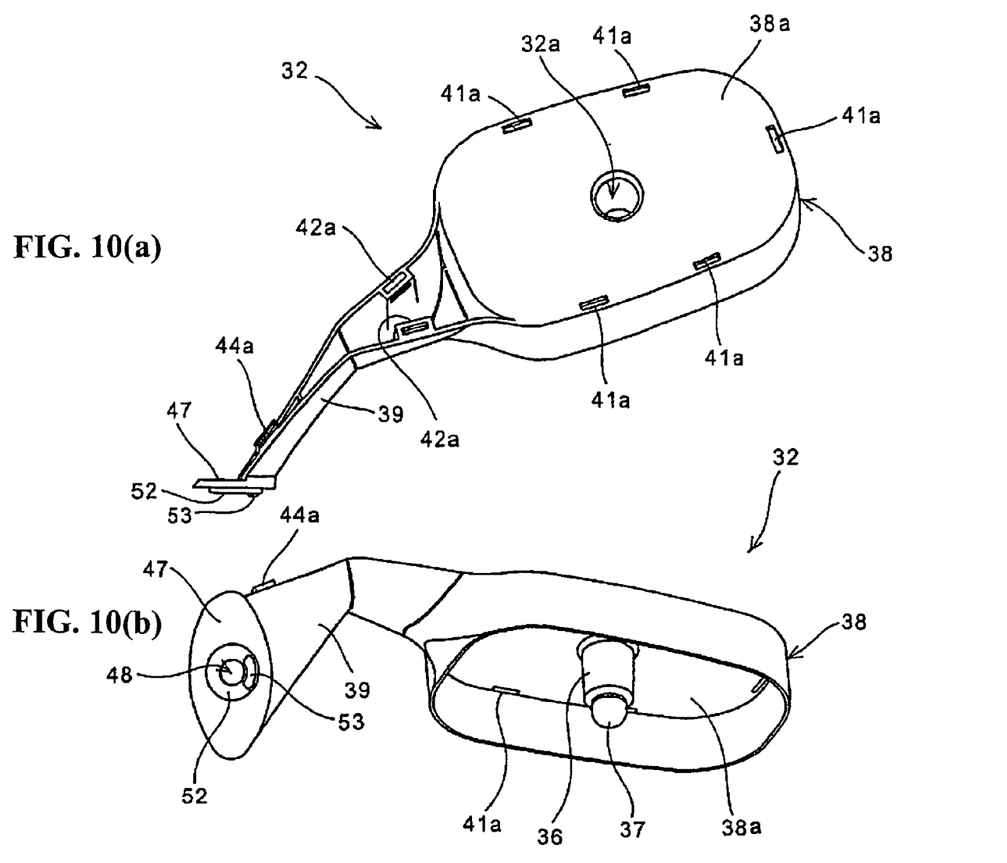
FIGS. 10(a) and 10(b) are perspective views of the rear housing viewed from two directions.

FIGS. 10(*a*) and 10(*b*) are perspective views of the rear housing 32 viewed from two directions. The attachment stay part 39 has a cross section in a substantially semicircular shape, and is engaged with the cover part 46 of the front housing 31, thus configuring a rearview mirror stay having a cross section in a substantially circular shape. A thick-walled part 52 to be engaged with the thin-walled part 82 and a projection part 53 in a substantially fan shape to be engaged with the groove part 83 are formed on a surface of the bottom plate 47 to be engaged with the attachment plate 34.

Figure 11A:
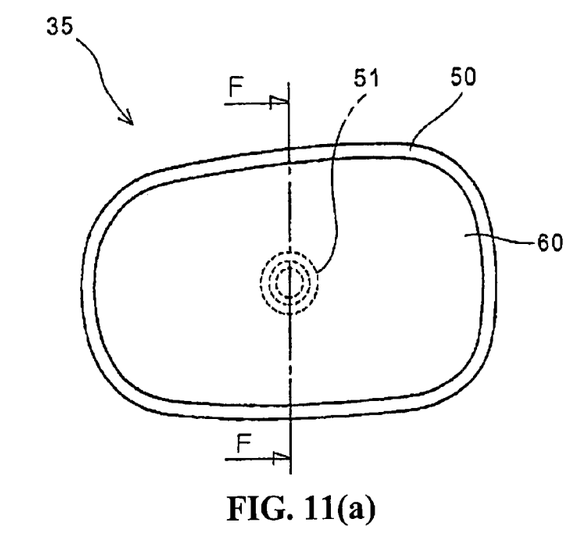
FIG. 11(a) is a front view of a mirror part.
Figure 11B:
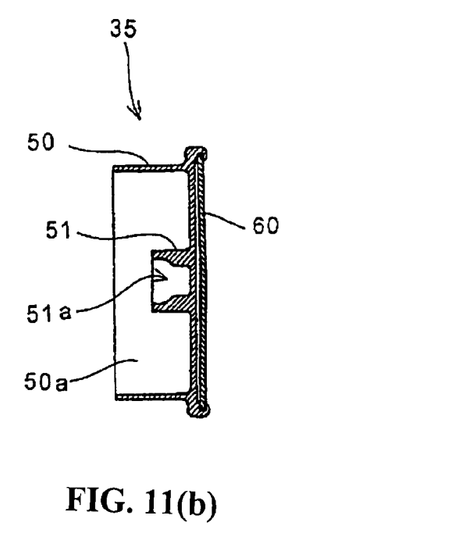
FIG. 11(b) is a cross sectional view taken along the line F-F of FIG. 11(a)

FIGS. 11(*a*) and 11(*b*) are a front view of the mirror part 35 and a cross-sectional view taken along the line F-F of FIG. 11(*a*), respectively. The cylindrical part 51 in which an engaging concave part 51*a* having a spherical shape is formed at a portion thereof is formed at a substantially middle portion of the base 50. By pushing the engaging projection 37 into the engaging concave part 51*a*, the mirror part 35 is supported by the rear housing 32, so that the angle thereof relative to the rear housing 32 can be adjusted. An extending wall 50*a* formed on one surface of the base 50 abuts on the plane part 38*a* of the front housing 31 at the time of adjusting the angle of the mirror part 35, so that the extending wall 50*a* has a function in which a range of adjustment falls within a predetermined range. Thus, the intrusion of water or dust into the engaging concave part 51*a* is prevented.

Figure 12:
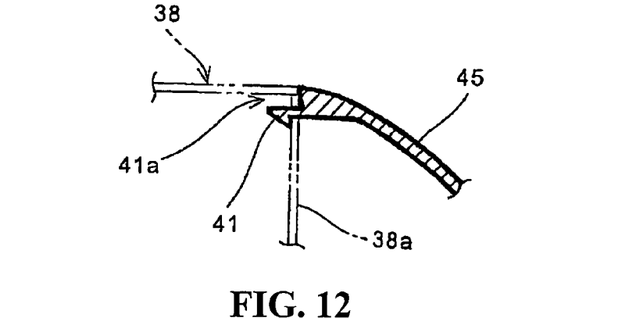
FIG. 12 is a cross sectional view taken along the line D-D of FIG. 8(a)

FIG. 12 is a cross-sectional view taken along the line D-D of FIG. 8(*a*). The first locking pawl 41 having a hook shape formed in the indicator system accommodation part 45 of the front housing 31 is engaged with the first locking hole 41*a* formed at an edge of the plane part 38*a* of the mirror accommodation part 38 of the rear housing 32. The other locking pawls and locking holes are the same in shape, and the front housing 31 and the rear housing 32 can be decomposed without using any tools in such a manner that the front housing 31 is bent to release the engagement of each locking pawl and locking hole.

Figure 13:
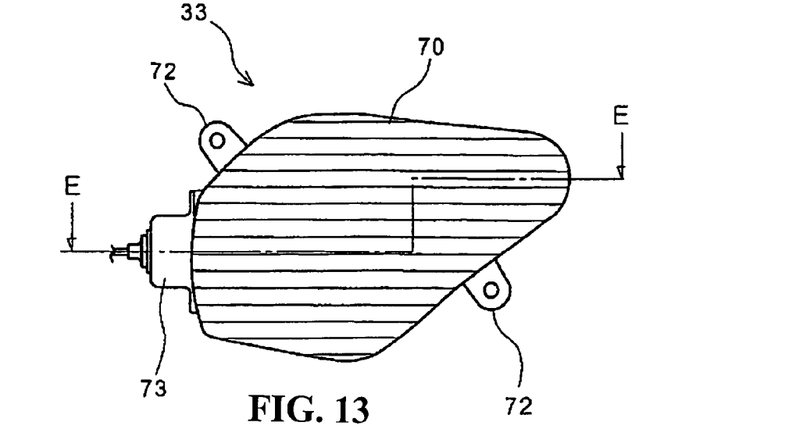
FIG. 13 is a front view of an indicator system.
Figure 14:
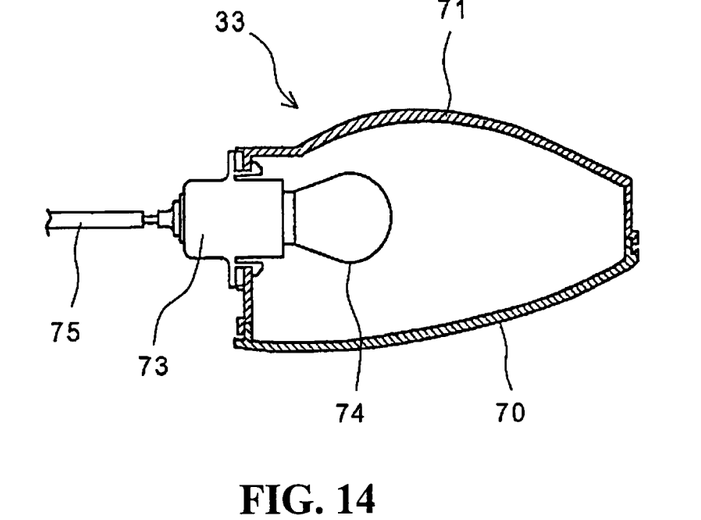
FIG. 14 is a cross sectional view taken along the line E-E of FIG. 13.

FIGS. 13 and 14 are a front view of the indicator system 33 and a cross-sectional view taken along the line E-E of FIG. 13, respectively. The indicator system 33 is configured in such a manner that a socket 73 with which the indicator bulb 74 is engaged is inserted into an attachment hole provided in the casing 71, and one lateral face of the casing 71 is covered with the indicator lens 70. As described above, the indicator system 33 is fixed to the front housing 31 in such a manner that the tapping screw 76 (see FIG. 4) is allowed to penetrate the attachment part 72 formed in the casing 71, and then is tightened with the attachment boss 40 formed on a back surface of the front housing 31. Therefore, the tightening members for fixing the indicator system 33 are invisible from the outside, and it is possible to enhance the appearance and high quality of the indicator-integrated rearview mirror 30. The socket 73 to which a wire 75 is connected can be detached from the casing 71, for example, only by turning the same by hand a predetermined angle without using any tools. As described above, since no tools are required for the attachment and detachment work of the front housing 31 to/from the rear housing 32, it is possible to exchange the indicator bulb 74 without using any tools in a state where the indicator-integrated rearview mirror 30 is assembled.

As described above, according to the indicator-integrated rearview mirror of the embodiment, the housing of the rearview mirror is divided into two a front housing and a rear housing which are made of resin, the indicator system is supported by the front housing, and the mirror part is supported by the rear housing. Thus, it is possible to simplify the structure of the indicator-integrated rearview mirror, and to cut down the number of components. Further, the front housing and the rear housing are attached to each other by engagement of the locking pawls and the locking holes which are formed in both housings. Thus, none of tightening members such as screws are required. Along with this, it is possible to cut down the number of components and to lighten the weight of the indicator-integrated rearview mirror. Furthermore, since none of tightening members such as screws are used, it is possible to reduce the number of work steps for assembling the mirrors, and to easily perform the disassembly work at the time of exchanging the indicator bulb, and the like.

It is obvious that the outline shapes of the front housing, the rear housing, the indicator system, and the mirror part, and the arrangement positions and the number of the locking pawls and the locking holes of the front housing and the rear housing are not limited to the above-described embodiment, but various modifications can be made. It should be noted that the light emitting source of the indicator system may be configured using a plurality of light-emitting diodes in place of an incandescent bulb.

Figure 15:
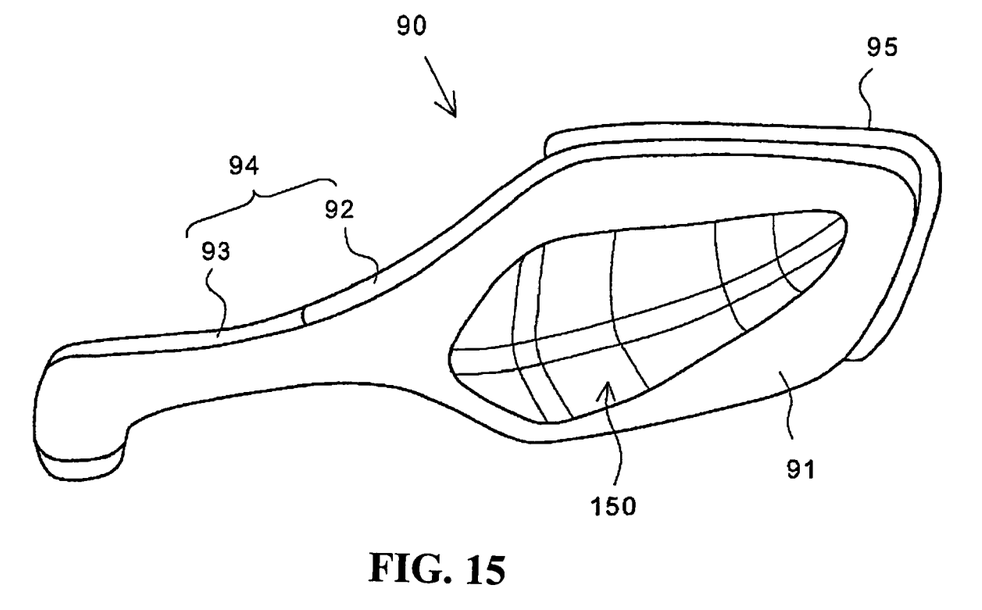
FIG. 15 is a perspective view of an indicator-integrated rearview mirror according to a second embodiment of the present invention.
Figure 16:
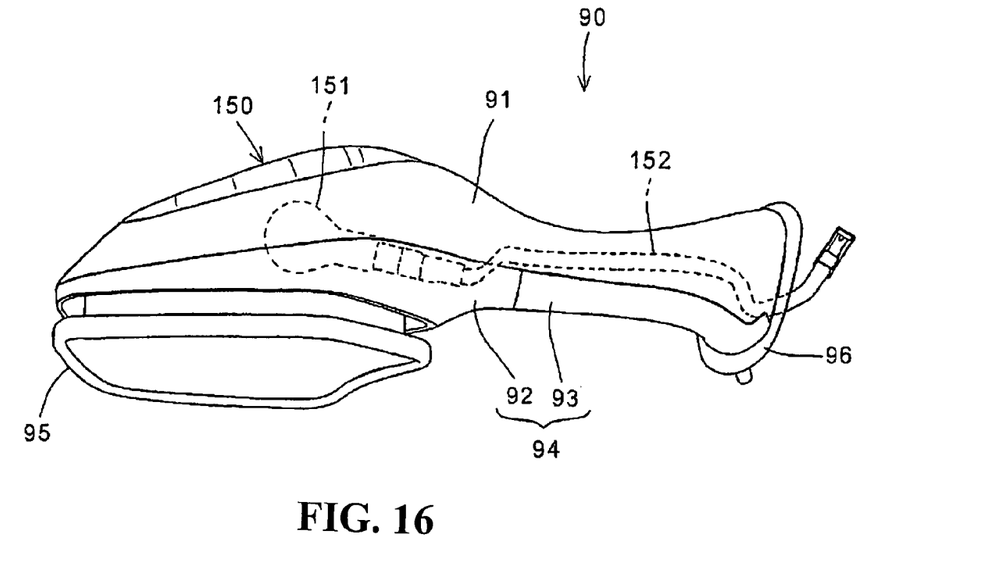
FIG. 16 is a top view of the indicator-integrated rearview mirror according to the second embodiment of the present invention.

FIGS. 15 and 16 are a perspective view and a top view of an indicator-integrated rearview mirror 90 according to a second embodiment of the present invention, respectively. The indicator-integrated rearview mirror 90 is configured by a front housing 91, a mirror holding part 92, an attachment stay 93, an indicator system 150, and a mirror part 95, and is attached to the vehicle body through an attachment plate 96 fixed to the attachment stay 93. In the embodiment, the mirror holding part 92 which supports the mirror part 95 while the angle thereof can be adjusted and the attachment stay 93 to be coupled to the mirror holding part 92 configure a rear housing 94 which faces the front housing 91. Accordingly, different materials can be used for the mirror holding part 92 and the attachment stay 93. In the embodiment, the mirror holding part 92 is formed using resin, whereas the attachment stay 93 is formed using aluminum that is harder than resin.

As described above, the rear housing 94 is divided into two and only a portion closer to the attachment part attached to the vehicle body is increased in strength. Accordingly, it is possible to increase the strength by which the indicator-integrated rearview mirror 90 is supported on the vehicle body-side while minimizing an increase in weight and manufacturing cost. Further, since the strength on the attachment part-side attached to the vehicle body is increased, a demand of increasing the strength of the components on the tip end-side, that is, the mirror holding part 92 and the front housing 91 is decreased. Thus, it is possible to lighten the weight of the whole mirror by reducing the thicknesses of these components. It should be noted that the attachment stay 93 may be formed using metal, other than aluminum, or carbon.

The indicator system 150 is supported by the front housing 91 in such a manner that only a light emitting part thereof faces outside from a window part formed in the front housing 91, and a power cord 152 to be connected to an indicator bulb 151 is coupled to a vehicle-body-side power source by passing through a space formed between the front housing 91 and the attachment stay 93.

Figure 17:
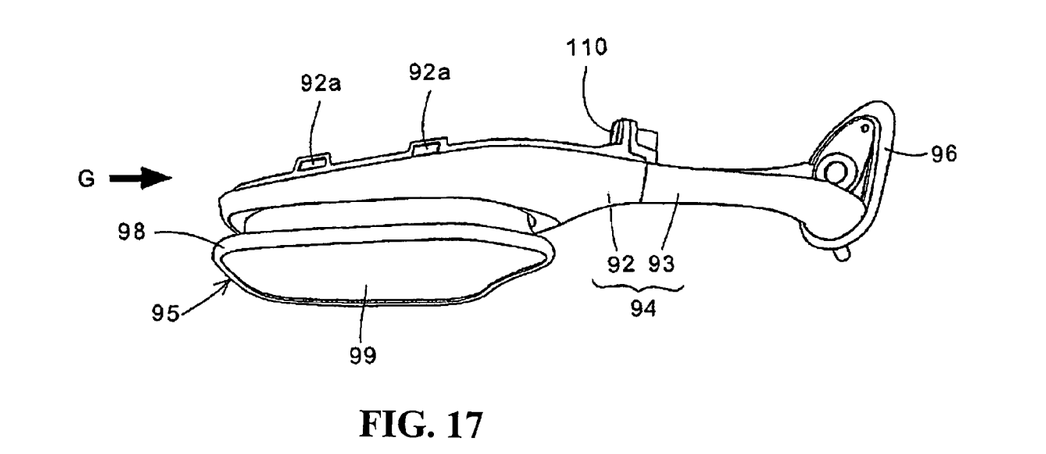
FIG. 17 is a top view of the indicator-integrated rearview mirror in a state where the front housing and the indicator system are detached therefrom.

FIG. 17 is a top view of the indicator-integrated rearview mirror 90 in a state where the front housing 91 and the indicator system 150 are detached therefrom. The rear housing 94 is configured in such a manner that the attachment stay 93 and the mirror holding part 92 are tightened together with a bolt 110. The front housing 91 and the rear housing 94 are attached to each other mainly by engagement of engaging pawls (not shown) formed in the front housing 91 with engaging holes 92a formed in the mirror holding part 92. In the embodiment, the attachment stay 93 and the attachment plate 96 are formed as an integral component made of aluminum. However, different materials may be used for the both as different components. The mirror part 95 is configured in such a manner that a reflecting mirror 99 is attached to a base 98 made of resin. A spherical-shaped concave part (not shown) formed at a substantially middle portion of the base 98 is engaged with a spherical-shaped convex part (not shown) formed in the mirror holding part 92, so that the mirror part 95 is supported while the angle thereof can be adjusted.

Figure 18:
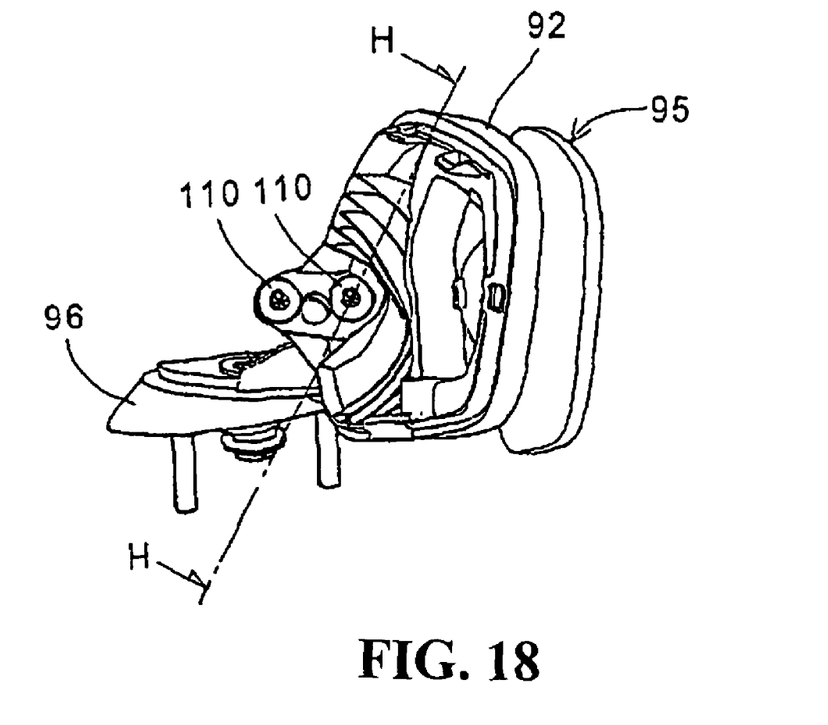
FIG. 18 is a view viewed from the G direction of FIG. 17.
Figure 19:
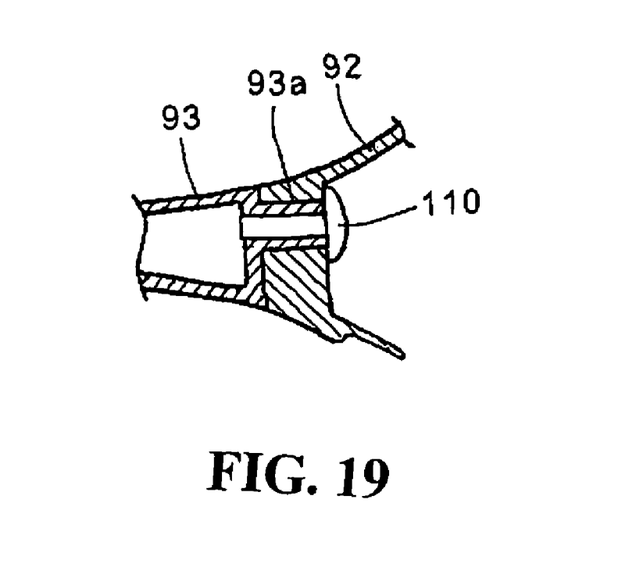
FIG. 19 is a cross sectional view taken along the line H-H of FIG. 18.

FIG. 18 is a view viewed from the G direction of FIG. 17. FIG. 19 is a cross-sectional view taken along the line H-H of FIG. 18. The attachment stay 93 is coupled to the mirror holding part 92 in such a manner that two columnar-shaped projections 93a having a screw hole formed on the attachment stay 93 are inserted into a through-hole formed in the mirror holding part 92, and both are tightened together with the bolt 110.

Figure 20:
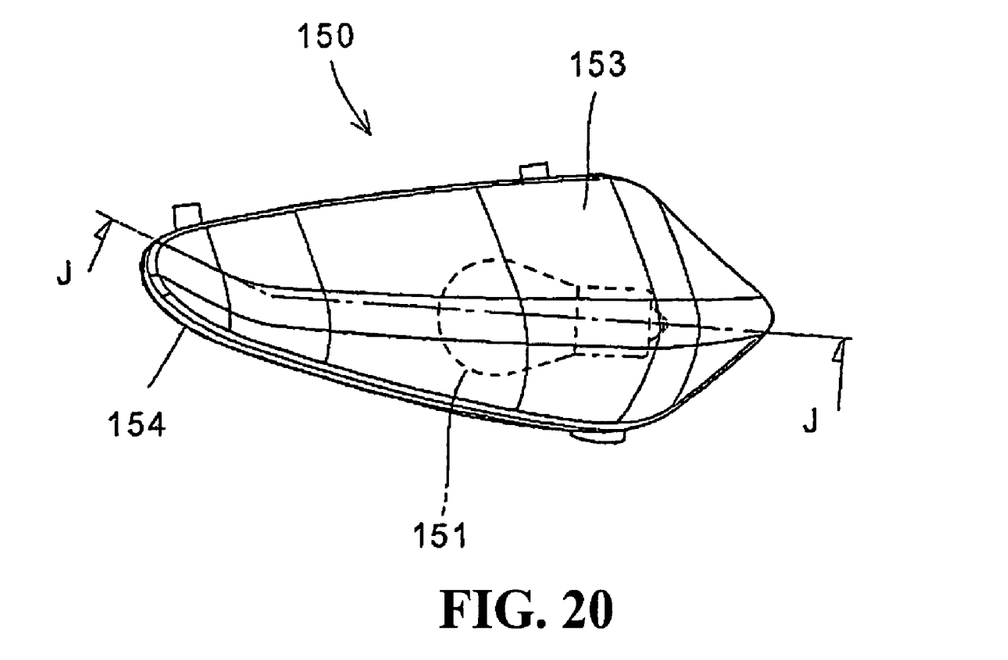
FIG. 20 is a front view of the indicator system.
Figure 21:
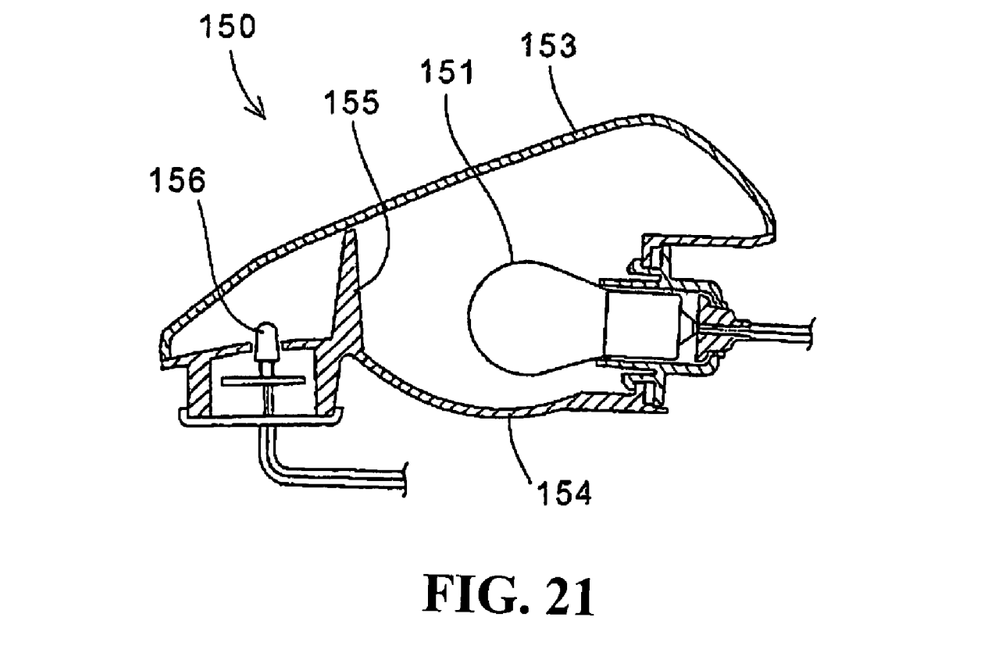
FIG. 21 is a cross sectional view taken along the line J-J of FIG. 20.

FIG. 20 is a front view of the indicator system 150. FIG. 21 is a cross-sectional view taken along the line J-J of FIG. 20. The indicator system 150 is tightened to a back surface of the front housing 91 using screws (not shown). The indicator system 150 is configured in such a manner that a casing 154 which supports an indicator bulb 151 that is configured by an incandescent bulb and a position lamp bulb 156 that is configured by an LED is covered with a transparent indicator lens 153 with or without color. In the casing 154, there is formed a shielding plate 155 by which lights or flashing lights of both bulbs do not interfere with each other.

Also in the second embodiment, the shapes of the front housing, the rear housing including the attachment stay and the mirror holding part, the indicator system, and the mirror part, and the materials of the attachment stay and the mirror holding part can be variously modified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An indicator-integrated rearview mirror for a vehicle comprising:
    a front housing and a separate rear housing which are connectable to each other to form a housing for the indicator-integrated rearview mirror;
    an indicator system disposed inside the front housing and a mirror part attached to the rear housing;
    said indicator system including a casing with an indicator lens, said casing accommodating an indicator bulb for selectively illuminating the indicator lens;
    said front housing includes a window on a front side thereof for accommodating the indicator lens;
    said casing being removably attached to the front housing with the indicator lens being positioned within the window of the front housing,
    wherein the casing includes:
        a planar side wall which is arranged vertically and extends rearwardly from the front side of the front housing in a direction perpendicular to a plane of the mirror part, and
        a circular hole formed in a central portion of the planar side wall, and
    wherein a socket is inserted at least part way through the circular hole so as to be secured directly onto the planar side wall.

2. The indicator-integrated rearview mirror for a vehicle according to claim 1, wherein a spherical-shaped engaging part for supporting the mirror part while the angle thereof can be adjusted is formed integrally with the rear housing.

3. The indicator-integrated rearview mirror for a vehicle according to claim 1, wherein the front housing and the rear housing are attached to each other by engagement of locking pawls with locking holes.

4. The indicator-integrated rearview mirror for a vehicle according to claim 1, wherein the socket and the indicator bulb have axes that extend substantially parallel to a planar surface of the mirror.

5. The indicator-integrated rearview mirror for a vehicle according to claim 1, wherein the rear housing has a plane part facing the front housing and locking holes are formed in the plane part of the rear housing at positions along edges thereof.

6. The indicator-integrated rearview mirror for a vehicle according to claim 1, wherein the indicator system is mounted on a central portion of the front housing in a position inward from a portion of the mirror part furthest away from the vehicle.

7. The indicator-integrated rearview mirror for a vehicle according to claim 1, wherein the rear housing is configured by integrally forming an accommodation part for the mirror part and an attachment stay part attached to a vehicle body-side.

8. The indicator-integrated rearview mirror for a vehicle according to claim 1, wherein the front housing is configured by integrally forming an accommodation part for the indicator system and a cover for covering an attachment stay part of the rear housing attached to a vehicle body-side.

9. The indicator-integrated rearview mirror for a vehicle according to claim 1, wherein the indicator bulb is positioned off-center with respect to the central portion of the indicator lens.

10. The indicator-integrated rearview mirror for a vehicle according to claim 1, wherein the indicator lens has an irregular surface with a portion closest to a vehicle body-side that is larger in area than a portion furthest away from the vehicle body-side.

11. An indicator-integrated rearview mirror adapted for use with a vehicle comprising:
a housing for the indicator-integrated rearview mirror, said housing being made of resin and being divided into a front housing and a rear housing which are connectable to each other;
an indicator system supported by and disposed inside the front housing, and a mirror part supported by the rear housing;
said indicator system including a casing with an indicator lens, said casing accommodating an indicator bulb for selectively illuminating the indicator lens;
said front housing includes a window on a front side thereof for accommodating the indicator lens;
said casing being removably attached to the front housing, wherein the casing includes:
a planar side wall of the casing which is arranged vertically and extends rearwardly from the front side of the front housing in a direction perpendicular to a plane of the mirror part, and
a circular hole formed in a central portion of the planar side wall, and
a socket having a hole into which the indicator bulb is inserted,
wherein the socket is inserted at least part way through the circular hole so as to be secured directly onto the planar side wall.

12. The indicator-integrated rearview mirror for a vehicle according to claim 11, wherein the indicator system is mounted on a central portion of the front housing in a position inward from a portion of the mirror part furthest away from the vehicle.

13. The indicator-integrated rearview mirror adapted for use with a vehicle according to claim 11, wherein a spherical-shaped engaging part for supporting the mirror part while the angle thereof can be adjusted is formed integrally with the rear housing.

14. The indicator-integrated rearview mirror for a vehicle according to claim 11, wherein the socket and the indicator bulb have axes that extend in a widthwise direction of the mirror part and of the vehicle.

15. The indicator-integrated rearview mirror for a vehicle according to claim 11, wherein the rear housing has a plane part facing the front housing and locking holes are formed in the plane part of the rear housing at positions along edges thereof.

16. The indicator-integrated rearview mirror for a vehicle according to claim 11, wherein the indicator lens has an irregular shape with a portion closest to a vehicle body-side that is larger in area than a portion furthest away for the vehicle body-side.

17. An indicator-integrated rearview mirror adapted for use with a vehicle comprising:
a housing made of resin and being divided into a front housing and a rear housing;
an indicator system supported by and disposed inside the front housing,
a front side of said front housing including a window for accommodating an indicator lens; and
a mirror part supported by the rear housing;
said indicator system including a casing with a planar side wall which is arranged vertically and extends rearwardly from the front side of the front housing in a direction perpendicular to a plane of the mirror part,
the planar side wall of the casing having a circular hole into which a socket is directly fitted, said casing accommodating an illuminating member for selectively illuminating the indicator lens;
said casing being removably attached to the front housing with the indicator lens being positioned within the window of the front housing,
wherein the illuminating member is an indicator bulb disposed directly in front of a rear wall of the casing and the mirror part is disposed behind the rear wall of the casing.

18. The indicator-integrated rearview mirror for a vehicle according to claim 17, wherein the socket and the indicator bulb have axes that extend in a widthwise direction of the mirror part and of the vehicle.

19. The indicator-integrated rearview mirror for a vehicle according to claim 17, wherein the rear housing has a plane part facing the front housing and locking holes are formed in the plane part of the rear housing at positions along edges thereof.

20. The indicator-integrated rearview mirror for a vehicle according to claim 17, wherein the indicator system is mounted on a central portion of the front housing in a position inward from a portion of the mirror part furthest away from the vehicle.

21. The indicator-integrated rearview mirror for a vehicle according to claim 17, wherein the indicator lens has an irregular surface with a portion closest to a vehicle body-side that is larger in area than a portion furthest away from the vehicle body-side.

* * * * *